United States Patent

Watanabe et al.

[11] 3,975,710
[45] Aug. 17, 1976

[54] CHARACTER PATTERN RECOGNITION METHOD AND APPARATUS USING FEATURE ENHANCED MAGNETIC DOMAIN PATTERNS

[75] Inventors: Teruji Watanabe, Niza; Hideo Ishihara, Kamakura, both of Japan

[73] Assignee: Kokusai Denshin Denwa Kabushiki Kaisha, Japan

[22] Filed: Mar. 4, 1974

[21] Appl. No.: 448,068

[30] Foreign Application Priority Data

Mar. 5, 1973   Japan .................... 48-25145

[52] U.S. Cl. ................. 340/146.3 C; 340/146.3 G; 340/174 YC; 340/174 TF; 346/74.1; 350/151; 356/114; 360/59
[51] Int. Cl.$^2$ ........................................ G06K 9/08
[58] Field of Search ............ 340/146.3 C, 146.3 E, 340/146.3 MA, 146.3 AQ, 174 TF, 174 YC, 173 LM, 173 LS; 350/151; 360/58, 59; 346/74 MT, 74.1; 356/114

[56] References Cited

UNITED STATES PATENTS

| | | | |
|---|---|---|---|
| 2,936,607 | 5/1960 | Nielsen | 340/146.3 E |
| 3,639,744 | 2/1972 | Hewitt | 350/151 |
| 3,760,357 | 9/1973 | Inose et al. | 340/146.3 MA |
| 3,786,428 | 1/1974 | Takahashi | 340/146.3 AQ |
| 3,787,825 | 1/1974 | DeJonge | 350/151 |
| 3,804,519 | 4/1974 | Outeru et al. | 350/151 |

OTHER PUBLICATIONS

Craig et al., "Bubble Domain Electronic–To–Optical Image Transducer," IBM Tech. Disclosure Bulletin, vol. 13, No. 1, June 1970, pp. 147–148.

Mayer, "Curie–Point Writing on Magnetic Films," Journal of Applied Physics, June, 1958, vol. 29, p. 1003.

Tchernev, "Extremely High Density Magnetic Information Storage," IEEE Transactions On Magnetics, Mar. 1968, p. 75.

Kump et al., "Laser Readout For Magnetic Film Memory," IBM Tech. Disclosure Bulletin, vol. 8, No. 9, Feb. 1966, pp. 1244–1245.

*Primary Examiner*—Leo H. Boudreau
*Attorney, Agent, or Firm*—Robert E. Burns; Emmanuel J. Lobato; Bruce L. Adams

[57] ABSTRACT

A character pattern recognition method and apparatus for recognizing an unknown character pattern in accordance with a correlation between the unknown character pattern and each known standard character pattern, in which the unknown character pattern is temporarily stored in a magnetic thin plate in a form of a magnetic domain pattern. The magnetic domain pattern is modified by varying the bias magnetic field on the magnetic thin plate to provide a modified unknown character pattern emphasizing the feature of the unknown character pattern stored in the magnetic thin plate. The modified unknown character pattern is compared with each known modified feature enhanced standard character pattern to obtain the correlation.

11 Claims, 17 Drawing Figures

CHARACTER PATTERN RECOGNITION METHOD AND APPARATUS USING FEATURE ENHANCED MAGNETIC DOMAIN PATTERNS

This invention relates to a character pattern recognition method and apparatus and, more particularly, to a system for performing character pattern recognition in consideration of the feature of each character pattern.

One of the conventional character pattern recognition methods is a so-called correlation method which examines the degree of overlapping of an unknown character pattern of each of a plurality of standard character patterns to select the closest one to the unknown character pattern. Among the methods of optically obtaining correlation, there has been proposed a method which examines the degree of overlapping of the unknown character pattern on the standard character pattern by scanning the unknown pattern with a flying spot scanner and by displaying the image of the unknown character pattern reproduced on a cathode-ray tube on a mask of the standard character pattern, and a method which calculates the coefficient of correlation by optical matched filtering using holography techniques as disclosed in a publication: IEEE Trans. Information Theory IT-10, vol 2, P139 – p145, April 1964. However, these methods have such defects that similar character patterns such as "O" and "Q", "E" and "F", a "comma", a "period" and a "hyphon" and the like are difficult to distinguish from one another and that the overall apparatus therefore becomes complicated.

An object of this invention is to provide a character pattern recognition method, which is adapted so that, in order to overcome the above defects, an unknown character pattern is once stored in the form of a magnetic bubble pattern in a magnetic thin plate and then subjected to a simple pre-processing step before obtaining correlation to emphasize features of the unknown character pattern, thereby providing for the enhanced accuracy of recognition.

The principle, construction and operations of this invention will be clearly understood from the following detailed description taken in conjunction with the accompanying drawings, in which.

Figure 1A:
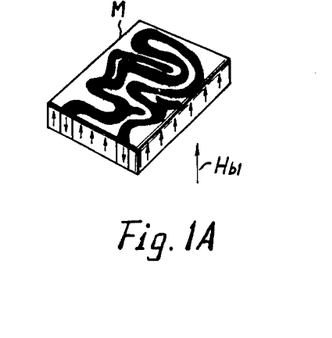
FIGS. 1A, 1B, 1C and 1D are perspective views explanatory of the principle for providing a magnetic domain pattern in a magnetic thin plate by the use of thermal energy in this invention.

With reference to FIG. 1A, a pattern of the magnetic domain is obtained in a case where a uniform bias magnetic field $H_{b1}$ is applied orthogonally to a magnetic thin plate M of orthoferrite, super garnet or the like, which is cut along the C-axis of crystal perpendicular to the plate plane. White areas on the surface of the magnetic thin plate M indicate regions which are magnetized upwardly with respect to the sheet plane, and black areas indicate regions downwardly magnetized.

Figure 1B:
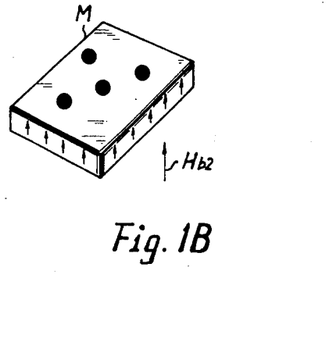

FIG. 1B is a diagram obtained in a case where, for example, the black areas shown in FIG. 1A are split at three points and divided into four parts and then the uniform bias magnetic field is intensified. It is known that four magnetic bubbles magnetized in a direction opposite to the bias magnetic field are produced in such a case.

Figure 1C:
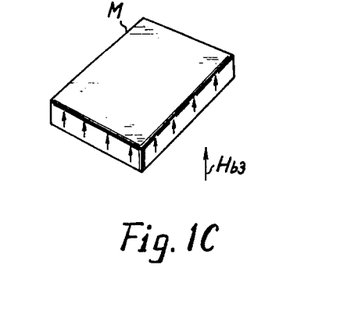

If the bias magnetic field $H_{b2}$ in FIG. 1B is further intensified to $H_{b3}$, the entire magnetic thin plate is saturated with the upward magnetization as shown in FIG. 1C. At the room temperature, the saturation cannot be removed unless a nucleation magnetic field $H_n$ is applied in a direction reverse to the magnetization.

Figure 1D:
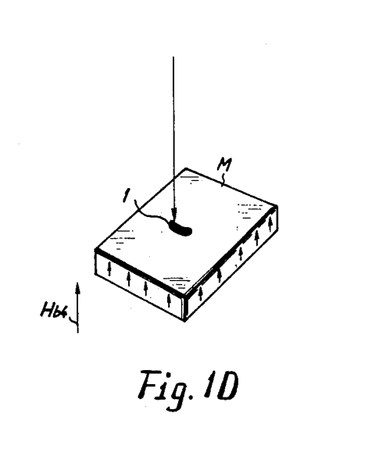

With reference to FIG. 1D, a method is described in which heat is applied to the saturated magnetic thin plate M at one part 1, thereby reversing the magnetization of the part 1 in a thermo-magnetic manner. At first, the bias magnetic field is decreased to a value $H_{b4}$ from the value $H_{b3}$ shown in FIG. 1C. The magnetic field $H_{b4}$ in this case is held at a value included in a range $H_{b1}$ to $H_{b2}$ but close to the value $H_{b2}$. Under such a condition, a laser beam or an electron beam of high energy irradiates the part 1 of the magnetic thin plate M to partially heat it. It is known that, in this case, the magnetization of this part is reversed by raising the temperature of the part 1 above the Curie point and then lowering the temperature below the Curie point. Consequently, a desired character pattern or a desired figure pattern can be drawn on the magnetic thin plate plane in the form of the magnetic domain pattern by changing the relative position of the magnetic thin plate M with respect to the heating beam.

Figure 2A:
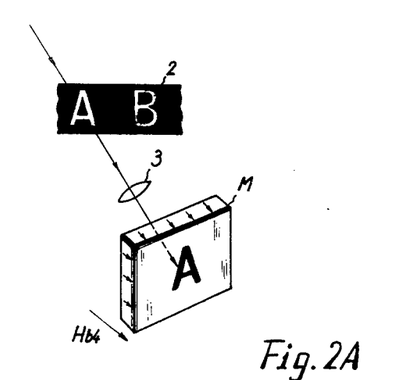
FIGS. 2A and 2B are respectively a perspective view and a system diagram explanatory of the principle for storing a character pattern in the form of a magnetic domain pattern in the magnetic thin plate by the use of thermal energy in this invention.
Figure 2B:
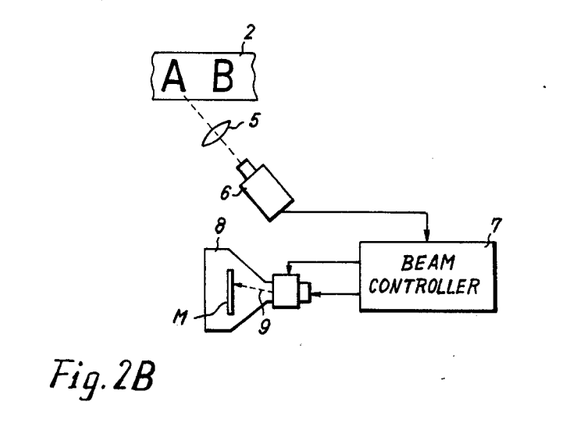

With reference to FIGS. 2A and 2B, the principle for storing a character pattern on the magnetic thin plate plane will be described.

FIG. 2A shows a case in which a document 2 having transparent character patterns is employed. In this case, light is irradiated to the document 2 from behind passes only at the transparent character pattern and is focused by a lens 3 into an image of the character pattern on the magnetic thin plate M. Accordingly, the magnetic thin plate M is irradiated by light and heated only at the same area as the character, so that the magnetization of only the magnetic domain corresponding to the character pattern is reversed as described above with reference to FIG. 1D, thus completing the storing operation.

FIG. 2B illustrates a case in which a document 2 having black-printed character patterns on a sheet of ordinary paper is employed. In this case, the character pattern is picked up by a scanning device, such as a television camera 6, through a lens 5. A video signal obtained at the camera 6 is applied to a beam controller 7. An electron beam 9 in a vacuum envelope 8 of a cathode-ray tube is controlled by scanning signals and an intensity modulation signal, which are provided at the beam controller 7, so that the magnetic thin plate M is scanned and heated only at exactly the same area as the shape of the character pattern. Accordingly, the magnetization of only the magnetic domain corresponding to the character pattern is reversed, thus completing the storing operation.

As mentioned above, the character pattern is temporarily stored in the magnetic thin plate in the form of a magnetic domain pattern by the use of a thermo-magnetic technique in this invention. Even if the character pattern is partially thin, the thickness of the magnetic domain pattern is improved due to the conductive property of heat within the magnetic thin plate. Therefore, this exhibits excellent character feature enhancement effects even if the character pattern is thin.

Figure 3A:
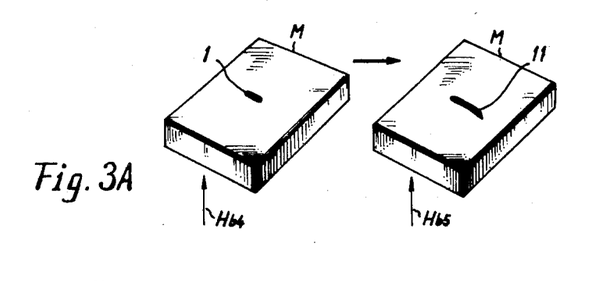
FIGS. 3A, 3B and 3C are perspective views explanatory of emphasizing of the features of character patterns on the magnetic thin plate in accordance with this invention.
Figure 3B:
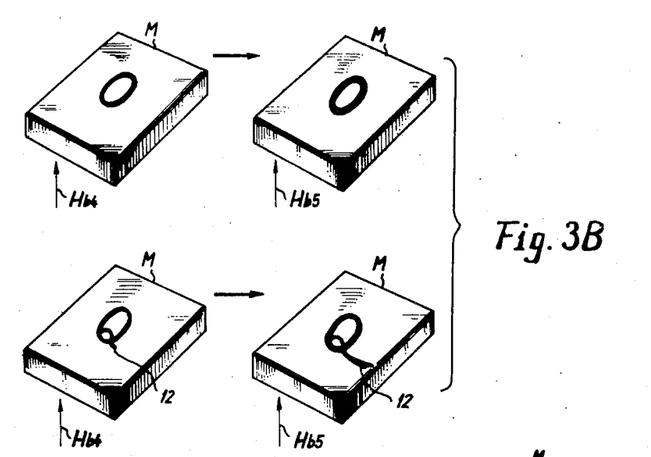
Figure 3C:
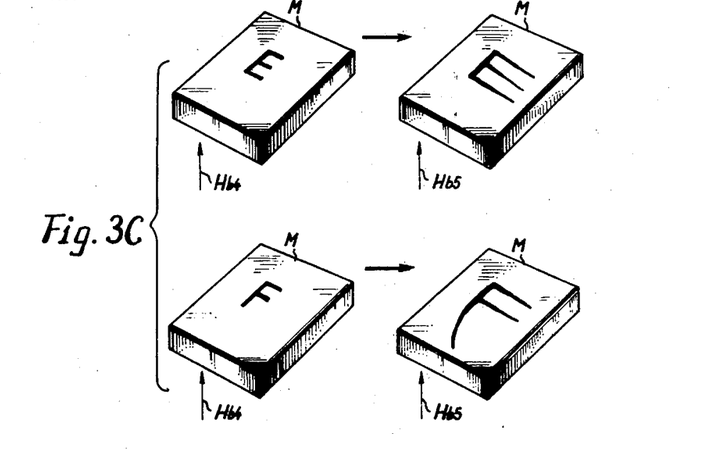

With reference to FIGS. 3A, 3B and 3C, an operation will be described in which features of character patterns stored on the magnetic thin film plate are emphasized in accordance with this invention.

With reference to FIG. 3A, the magnetic domain 1 stored under such a bias magnetic field $H_{b1}$ as mentioned above with regard to FIGS. 1A, 1B, 1C and 1D is elongated along the lengthwise direction as shown by a reference 11 in a case where the bias magnetic field is decreased from the value $H_{b4}$ to a value $H_{b5}$. In FIGS. 3B and 3C, states of the magnetic domain are illustrated in cases where character patterns O, Q, E and F are stored on the magnetic thin plate M under the bias magnetic field $H_{b4}$ and thereafter the bias magnetic field is reduced to a value $H_{b5}$. In FIG. 3B, even if the bias magnetic field is decreased, only the width of the thin line of O slightly increases and substantially no change occurs thereon. On the other hand, in the case of the character pattern Q, a part 12 thereof extends to provide a pattern extremely different from the character pattern O, thus emphasizing the distinguishing feature of the character pattern Q. In general, alphabets, numerals or like patterns which resemble each other can be effectively distinguished from each other by emphasizing the difference or distinguishing feature therebetween by the above operation of this invention. In a case of character patterns E and F as shown in FIG. 3C, the difference between these characters is sufficiently emphasized after adjusting the bias field. Since it can be previously known by calculations or actual tests what modified shape magnetic domain patterns of the 26 alphabets, numerals or the like characters assume after the bias magnetic field is obtained, the character patterns of the magnetic domains obtained after decreasing the bias magnetic field can be employed as standard character patterns.

As will be apparent from the foregoing description, before examining the degree of similarity of an unknown character pattern to a standard character pattern by mutual superposition, the unknown character pattern is temporarily stored on the magnetic thin plate and then modified to a modified unknown character by decreasing the bias magnetic field. Thereafter, the degree of similarity is measured (hereinafter referred as "filtering") by using as the standard character pattern a pattern (hereinafter referred as a "modified standard character pattern") obtained after decreasing the bias magnetic field, so that the degree of difference between similar character patterns can be effectively improved.

Figure 4:
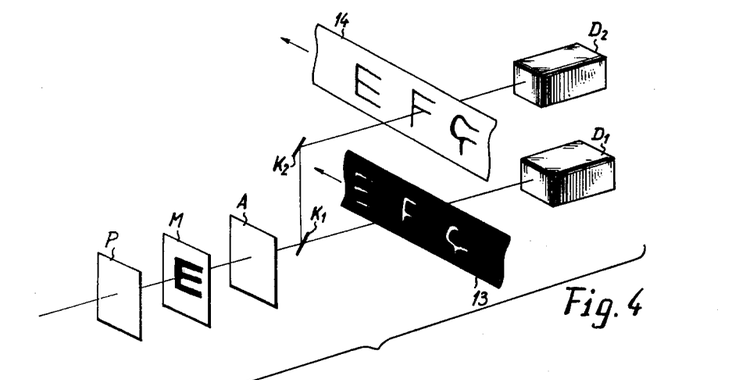
FIG. 4 is a perspective view illustrating one example of the construction necessary for optically obtaining the correlation between a character pattern stored in the magnetic thin plate and each of standard character patterns in this invention.

With reference to FIG. 4, an example of the above filtering will be described in which a magneto-optical effect is utilized to perform the filtering of a modified unknown character pattern with respect to a modified standard character pattern. For convenience of description, the magnetic domain in the magnetic thin plate M has been described above as if visible but, in practice, it is invisible. The most convenient measures employed in the case of optically handling the magnetic domain are techniques using a magneto-optical effect (Faraday effect in this case). Namely, as shown in FIG. 4, a polarizer plate P and a light detecting plate A identical with the polarizer plate are disposed before and after the magnetic thin plate M under a bias magnetic field not shown in such a manner that their polarization axes intersect each other at right angles. Then Faraday effect is observed under the irradiated light. Light passes only through the region in which the modified unknown character pattern E is stored. The light is split by a semitransparent mirror $K_1$ into two parts, which are respectively applied to photo-electric converters $D_1$ and $D_2$ through a negative modified standard character mask 13 and a positive modified standard character mask 14 respectively. In this case, if a modified standard character pattern is selected on the masks 13 and 14 so that it provides a maximum output from the photo-electric converter $D_1$ and a minimum converter from the photo-electric converter $D_2$, it is known that the same character pattern corresponding to that on the masks 13 and 14 at that time is stored in the magnetic thin plate M. Furthermore, since the contrast between the background and the character pattern can be reversed at the observation of Faraday effect by changing a little the relative positions of the polarizer plate P, the magnetic thin plate M and the light detecting plate A to one another in place of employing the negative mask 13 and the positive mask 14, it is also possible to perform character pattern recognition by the use of only a photo-electric converter and either one of the masks 13 and 14.

Figure 5:
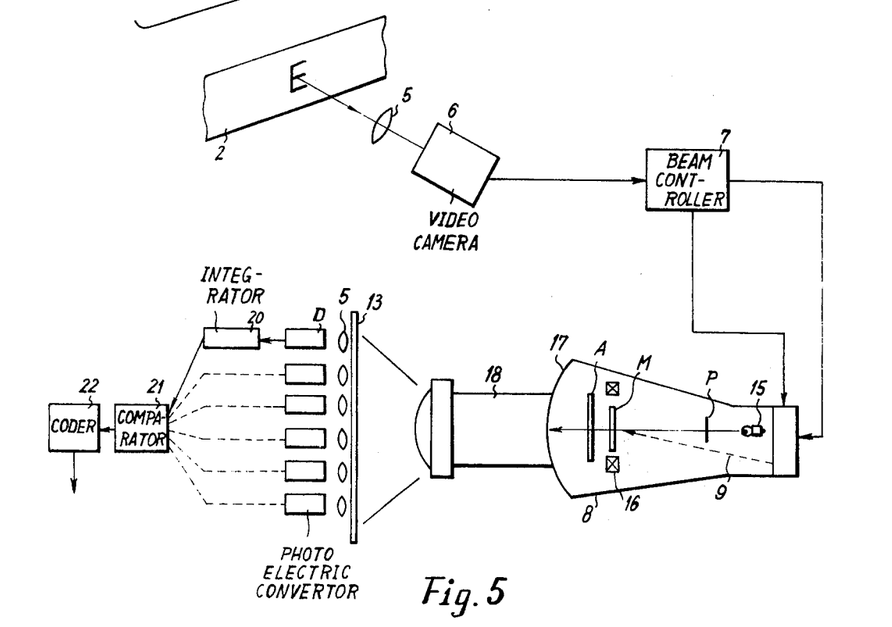
FIG. 5 is a block diagram illustrating an example of this invention.

With reference to FIG. 5, an example of this invention will be described. An unknown character pattern provided on a printing paper 2 is picked up by a video camera 6 through a lens 5. A video signal obtained with the video camera 6 is applied to a beam controller 7, from which horizontal and vertical sweep signals and an intensity modulation signal are obtained. An electron beam 9 in a vacuum envelope 8 of cathode-ray-tube is controlled by the sweep signals and the intensity modulation signal to store the unknown character pattern in a magnetic thin plate M. The unknown character pattern thus stored in the magnetic thin plate M is subjected to a decrease in the applied bias magnetic field by a coil 16, so that a modified unknown character pattern is provided in the magnetic thin plate M. On the other hand, light emitted from a light source 15 is polarized by a polarizer plate P and passes through the magnetic thin plate M and a light detecting plate A to reach a phosphor screen 17. In this process, the modified unknown character pattern is read out by the use of Faraday effect and appears on the phosphor screen 17 in the form of a bright line area. The image thus obtained on the phosphor screen 17 passes through a special optical tunnel 18, as disclosed on page 7 of a book titled "OPTICAL CHARACTER RECOGNITION" edited by Fischer Pollock & Radack Stevens, and is split thereby into many identical images arranged in the form of a matrix. These images are respectively projected on various sections of a modified standard character pattern mask 13, on which negative modified standard character patterns of all handled character patterns are disposed in the form of a matrix. Consequently, light passing through the modified standard character pattern mask 13 is maximum when the modified unknown character pattern coincides with one of the modified standard character patterns, which is provided in one section of the matrix of the modified standard character pattern mask 13. Then, the light having passed through the mask 13 passes through lenses 5 disposed behind the mask 13 and reaches photo-electric converters D, each of which detects the amount of light. The detected signals are applied respectively to integrators 20, whose outputs are then applied to a comparator 21 to detect the location of the maximum output. Then the negative-to-positive relation of the image projected on the phosphor screen 17 is inverted by adjusting the relative positions of the polarizer plate P and the light detecting plate A with respect to each other so that amounts of light are simultaneously detected by the photo-electric converters D, whose detected outputs are applied to the comparator 21 to detect an address of minimum output. The unknown character pattern is detected from information of the output of the comparator 21, and a coded output corresponding thereto is obtained from a coder 22.

After processing of one unknown character pattern is completed in the above system, the bias magnetic field is increased by the coil 16 to the value $H_{b3}$ to magnetize the magnetic thin plate M in one direction to saturate it so that a subsequent pattern is applied under the bias magnetic field $H_{b4}$. Namely, the system repeats the above operations for each pattern, so that subsequently applied unknown character patterns can be recognized one by one in response to the travelling of the document 2.

It will be readily understood that holography techniques may also be employed for obtaining the correlation between the modified unknown character pattern and the modified standard character pattern.

Figure 6A:
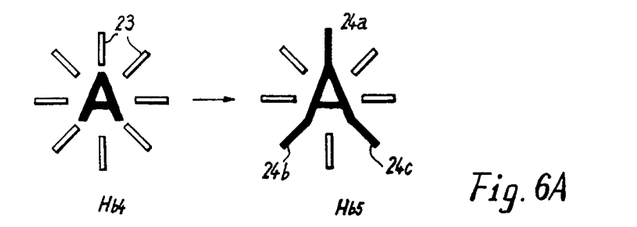
FIGS. 6A and 6B are plan views explanatory of the construction employed for further emphasizing the features of character patterns on the magnetic thin plate in this invention.
Figure 6B:
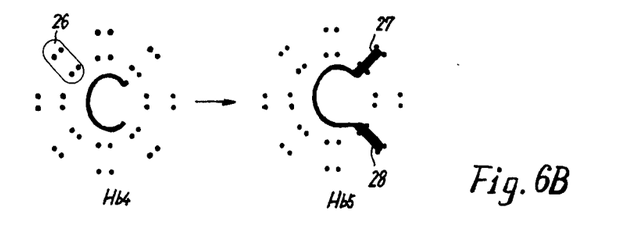

With reference to FIGS. 6A and 6B, an important principle will be described in which modification of an unknown character pattern stored on the magnetic thin plate is further ensured in accordance with the feature of this invention. It is generally known that in a case where a thin film of soft permalloy of high permeability or the like is partially disposed on a magnetic thin plate magnetized orthogonally to its surface, electrostatic energy decreases at a condition where the magnetic domain exists under the permalloy thin film. Accordingly, if a soft permalloy thin film of a desired configuration is partially disposed on the magnetic thin plate, it is possible to provide a magnetic domain guide path guiding the magnetic domain to the part underlying the soft permalloy thin film.

In FIG. 6A, reference numerals 23, 24 indicate the magnetic domain guide paths formed by soft permalloy thin film segments, which are arranged in a radial pattern. The magnetic domain guide paths 23 are disposed around pattern formation area of the magnetic thin plate, in which an unknown character pattern is to be stored as illustrated. In the above arrangement, when character pattern modification is achieved by reducing the bias magnetic field to a value $H_{b5}$, end parts or corners of the magnetic domain of the stored character pattern are positively attracted to and guided by the magnetic domain guide paths 23 (i.e. 24a, 24b and 24c), so that a stable modified character pattern can be obtained.

With reference to FIG. 6B, the same operation as described above is achieved by the use of magnetic domain guide paths 26 formed by permalloy dots. In this case also, if the bias magnetic field is decreased, the end parts of the magnetic domain are positively attracted to the magnetic domain guide paths 27 and 28 to be guided thereby. An optimum arrangement of the magnetic domain guide paths can be selected in accordance with the configuration of an unknown character pattern to be recognised and the number, the position and the shape of the guide paths will be selected, depending upon the geometry of the unknown character patterns to be recognized.

Figure 7A:
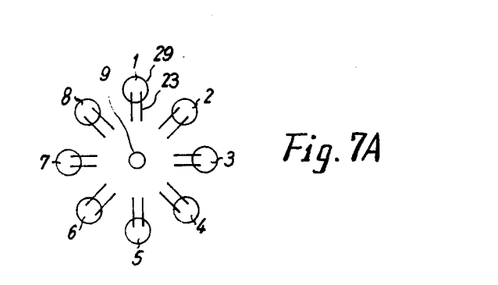
FIGS. 7A, 7B, 7C and 7D are diagrams illustrating an example of detection circuitry employed in another example of this invention.
Figure 7B:
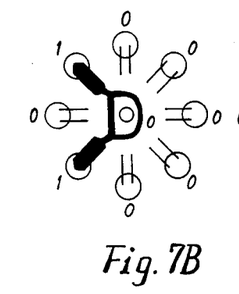
Figure 7C:
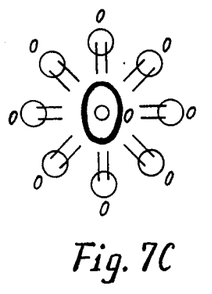

With reference to FIGS. 7A, 7B and 7C, another example of the character pattern recognition apparatus embodying the method of this invention will be described. FIG. 7A shows a circuit, in which magnetic domain detectors 29 such as Hall effect elements or the like are disposed in combination with the magnetic domain guide paths 23. This circuit is closely contacted with the magnetic thin plate, while a magnetic domain is stored in the magnetic thin plate at its center position and the character pattern modification is effected by decreasing the bias magnetic field. The magnetic domain, which is guided and extended by the magnetic domain guide paths, can be detected by the magnetic domain detectors 29. Therefore, if the output of each detector of the circuit to which the magnetic domain is not guided assumes the state 0, and if the output of the detector of the circuit in which the magnetic domain is guided assumes the state 1, it is possible to obtain a code unit of nine bits which differ from one another in correspondence to each character pattern.

Figure 7D:
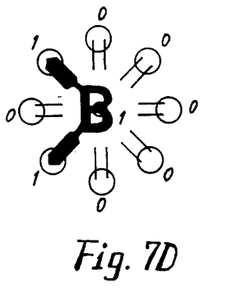

In FIGS. 7B, 7C and 7D, a code unit for a character pattern D is 000001010, a code unit for a character pattern 0 is 000000000, and a code unit for a character pattern B is 000001011. The employment of the above detecting principle does not involve the use of the optical process for obtaining the correlation. Namely, it is sufficient to obtain the correlation by digital techniques between the digital signals such as the code units 000001010, 000000000 and 000001011 for the character patterns D, O and B prepared as standard character pattern signals and the code units obtained from the detectors, so that the overall apparatus can be simplified. The magnetic domain guide paths described above with reference to FIGS. 6A, 6B and 7A are also effective for hand-written character patterns other than typewritten character patterns.

As has been described above in detail, this invention employs the principle, in which an unknown character pattern is first stored in a magnetic thin plate in the form of a magnetic domain and then modified to emphasize its feature before the correlation is obtained. Therefore, this invention has excellent advantages in that the ability to distinguish similar character patterns is effectively improved and that the overall construction of apparatus can be simplified.

What we claim is:

1. A method of character pattern recognition comprising;
   a. providing a magnetic thin film capable of forming magnetic domains therein;
   b. biasing the magnetic thin film with an external magnetic field to form a large magnetic domain within the magnetic thin film;
   c. heating a region of the large magnetic domain formed in the magnetic thin film to develop a region of magnetization having a spatial polarity opposite that of the large magnetic domain and shaped like a character pattern to be recognized;

d. changing the intensity of the biasing magnetic field to effect growth of the region of magnetization shaped like the character pattern to be recognized to effect enhancement of distinguishing features of the character pattern to be recognized; and e. then comparing the shape of the region of magnetization shaped like the character pattern to be recognized and having its distinguishing features enhanced with patterns of known characters, having the distinguishing features of the known character patterns similarly enhanced, to determine which of the known character patterns the character pattern to be recognized is most similar.

2. A method of character pattern recognition according to claim 1, wherein the step of heating a region of the large magnetic domain comprises:

a. providing a generally opaque mask having a transparent region shaped like the character pattern to be recognized; and b. illuminating the large magnetic domain with light through said mask to illuminate and effect heating only in a region of the large magnetic domain shaped like the character pattern to be recognized.

3. A method of character pattern recognition according to claim 1, wherein the step of heating a region of the large magnetic domain comprises: impacting charged particles on a region of the large magnetic domain shaped like the character pattern to be recognized to effect heating of the region shaped like the character pattern to be recognized.

4. A method of character pattern recognition according to claim 1, wherein the step of comparing the character pattern, with its distinguishing features enhanced, to be recognized with known character patterns having their distinguishing features similarly enhanced comprises:

a. illuminating the large magnetic domain with polarized light;

b. analyzing the polarized light, transmitted through the large magnetic domain, with a polarizer to obtain a spatial light pattern in the shape of the enhanced character pattern to be recognized;

c. illuminating masks shaped like known enhanced character patterns with the spatial light pattern in the shape of the enhanced character pattern to be recognized; and d. then measuring the intensity of the light passing through the illuminated masks to determine which of the masks corresponds to the shape of the enhanced character pattern to be recognized.

5. A method of character pattern recognition according to claim 1, further comprising: providing a plurality of magnetic domain guide paths on said magnetic thin film to define a character pattern formation area; and wherein the step of heating a region of the large magnetic domain comprises heating a region of the large magnetic domain within the character formation area; and wherein the step of changing the intensity of the biasing magnetic field comprises changing the intensity of the biasing magnetic field to effect sufficient growth of the region of magnetization shaped like the character pattern to be recognized to interact with said magnetic domain guides to effect deformation of the region of magnetization shaped like the character pattern to be recognized to aid in the identification thereof.

6. A method of character pattern recognition according to claim 5, wherein the step of providing a plurality of magnetic domain guide paths comprises providing said guide paths circumferentially about said character pattern formation area and extending radially thereof.

7. A method of character pattern recognition according to claim 1, further comprising; providing a plurality of magnetic sensors on said magnetic thin film to define a character pattern formation area, and wherein the step of heating a region of the large magnetic domain comprises heating a region of the large magnetic domain within the character formation area; and wherein the step of changing the intensity of the biasing magnetic field comprises changing the intensity of the biasing magnetic field to effect sufficient growth of the region of magnetization shaped like the character pattern to be recognized to be sensed by said magnetic sensors.

8. A method of character pattern recognition according to claim 1, wherein the step of heating a region of the large magnetic domain comprises, heating a region of the large magnetic domain formed in the magnetic thin film to develop a region of magnetization having a spatial polarity opposite that of the large magnetic domain and shaped like an alpha-numeric character pattern to be recognized; and wherein the step of comparing the shape of the region of magnetization shaped like the character pattern to be recognized comprises, comparing the shape of the region of magnetization shaped like the alpha-numeric character pattern to be recognized and having its distinguishing features enhanced with patterns of known alpha-numeric characters, having the distinguishing features of the known alpha-numeric characters similarly enhanced, to determine which of the known alpha-numeric character patterns the alpha-numeric character pattern to be recognized is most similar.

9. In a character pattern recognition apparatus of the type having a substrate having a major surface with a magnetic thin film disposed thereon; means for applying a biasing magnetic field of controllable intensity to said magnetic thin film for controlling the formation and growth of magnetic domains therein; means for heating regions of said magnetic thin film to form therein a magnetic domain shaped like a character pattern to be recognized; means for reading out the shape of the magnetic domain shaped like a character pattern to be recognized; and means for comparing the read out shape of the character pattern to be recognized with patterns of known characters to determine which of the character patterns the character pattern to be recognized is most similar; the improvement which comprises:

means for effecting enhancement of distinguishing features of the magnetic domain shaped like a character pattern to be recognized comprising a plurality of magnetic domain guide paths disposed on said magnetic thin film to define a pattern formation area free of said guide paths and about which said guide paths are disposed, each of said guide paths being elongated and disposed peripherally about said pattern formation area with the major dimension of each of said guide paths extending radially of the pattern formation area to effect the growth of the magnetic domain shaped like a character pattern to be recognized to enhance distinguishing features of the character pattern to be recognized; and wherein said means for comparing comprises means for comparing the shape of the magnetic domain shaped like the character pattern to be recognized and having its distinguishing features enhanced with patterns of known characters, having the distinguishing features of the known features similarly enhanced, to determine which of the character patterns the character pattern to be recognized is most similar.

10. In a character pattern recognition apparatus according to claim 9, wherein said means for reading out comprises a plurality of magnetic sensors, and wherein each sensor of said plurality of sensors is disposed adjacent a respective one of said magnetic domain guide paths for detecting when a portion of the magnetic domain shaped like the character pattern to be recognized is within a guide path.

11. In a character pattern recognition apparatus of the type having a substrate having a major surface with a magnetic thin film disposed thereon; means for applying a biasing magnetic field of controllable intensity to said magnetic thin film for controlling the formation and growth of magnetic domains therein; means for heating regions of said magnetic thin film to form therein a magnetic domain shaped like a character pattern to be recognized; means for reading out the shape of the magnetic domain shaped like a character pattern to be recognized; and means for comparing the read out shape of the character pattern to be recognized with patterns of known characters to determine which of the character patterns the character pattern to be recognized is most similar; the improvement which comprises:

means for effecting enhancement of distinguishing features of the magnetic domain shaped like a character pattern to be recognized comprising a plurality of magnetic domain guide paths disposed on said magnetic thin film to define a pattern formation area free of said guide paths and about which said guide paths are disposed, each of said guide paths being elongated and disposed peripherally about said pattern formation area with the major dimension of each of said guide paths extending radially of the pattern formation area to effect the growth of the magnetic domain shaped like a character pattern to be recognized to enhance distinguishing features of the character pattern to be recognized;

wherein said means for reading out comprises a plurality of magnetic sensors, and wherein each sensor of said plurality of sensors is disposed adjacent a respective one of said magnetic domain guide paths for detecting when a portion of the magnetic domain shaped like the character pattern to be recognized is within a guide path; and wherein said means for comparing comprises means for comparing the shape of the magnetic domain shaped like the character pattern to be recognized and having its distinguishing features enhanced with patterns of known characters, having the distinguishing features of the known features similarly enhanced, to determine which of the character patterns the character pattern to be recognized is most similar.

* * * * *